United States Patent
Qian et al.

(10) Patent No.: US 10,670,463 B2
(45) Date of Patent: Jun. 2, 2020

(54) PRINTING USING A SPECTROPHOTOMETER

(71) Applicant: Hewlett-Packard Development Company, L.P., Houston, TX (US)

(72) Inventors: Li Qian, Sant Cugat del Valles (ES); Xavier Domingo, Sant Cugat del Valles (ES); Alfonso Sanchez, Sant Cugat del Valles (ES); Secundino Vicente Vicente, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 158 days.

(21) Appl. No.: 16/073,376

(22) PCT Filed: May 10, 2016

(86) PCT No.: PCT/US2016/031627
§ 371 (c)(1),
(2) Date: Jul. 27, 2018

(87) PCT Pub. No.: WO2017/196301
PCT Pub. Date: Nov. 16, 2017

(65) Prior Publication Data
US 2019/0049305 A1 Feb. 14, 2019

(51) Int. Cl.
*G01J 3/52* (2006.01)
*B41M 3/00* (2006.01)
(Continued)

(52) U.S. Cl.
CPC ............... *G01J 3/52* (2013.01); *B41M 3/00* (2013.01); *B41M 3/008* (2013.01); *G01J 3/462* (2013.01);
(Continued)

(58) Field of Classification Search
CPC .... G01J 3/524; G01J 3/501; G01J 3/52; G01J 3/462; G01J 3/463; B41J 11/008;
(Continued)

(56) References Cited

U.S. PATENT DOCUMENTS 7,460,706 B2   12/2008   Doumoto et al.
8,203,768 B2   6/2012    Klassen
(Continued)

FOREIGN PATENT DOCUMENTS

GB      2409122         6/2005
JP      2013018277      1/2013
WO      WO-2015147820   10/2015

OTHER PUBLICATIONS

Lindstrom, P., "Advanced proofing—spot colours", Digital Dots Ltd., 2007, 10 pages.

*Primary Examiner* — Kim Y Vu
*Assistant Examiner* — Michael J Vanchy, Jr.
(74) *Attorney, Agent, or Firm* — HP Inc. Patent Department

(57) ABSTRACT

Examples herein provide a method. The method includes printing first color patches at a first location on a first side of a print medium. The method includes generating an international color consortium ("ICC") profile of the first side by characterizing the first color patches using a spectrophotometer. The method includes printing, using the ICC profile of the first side, second color patches at a second location on the first side of the print medium. The method includes printing third color patches on a second side of the print medium, the third patches being a registered mirrored copy of the second patches. The method includes generating an ICC profile of the second side by characterizing the registered second and third patches using the spectrophotometer.

15 Claims, 8 Drawing Sheets

(51) Int. Cl.
*G01J 3/46* (2006.01)
*H04N 1/60* (2006.01)
B41M 5/00 (2006.01)

(52) U.S. Cl.
CPC ............. *G01J 3/463* (2013.01); *H04N 1/60* (2013.01); *H04N 1/6005* (2013.01); *H04N 1/6038* (2013.01); *B41M 5/0047* (2013.01); *B41M 5/0064* (2013.01)

(58) Field of Classification Search
CPC .. G06K 15/021; G06K 15/027; H04N 1/6033; H04N 1/60; H04N 1/00023; H04N 1/00087; H04N 1/6005; H04N 1/6038; B41M 3/00; B41M 3/008; B41M 5/0047; B41M 5/0064; G01N 21/251; G01N 21/274; B41F 33/0036; B41P 2233/51; D21H 19/84
See application file for complete search history.

(56) References Cited

U.S. PATENT DOCUMENTS

| | | |
|---|---|---|
| 8,922,831 B2 | 12/2014 | Suzuki et al. |
| 2003/0007154 A1 | 1/2003 | Tandon et al. |
| 2005/0243317 A1* | 11/2005 | Baker ................. G01J 3/524 356/402 |
| 2008/0094646 A1 | 4/2008 | Ozaki et al. |
| 2010/0238461 A1 | 9/2010 | Chauvin et al. |
| 2013/0293613 A1* | 11/2013 | Berel .................... B41J 3/28 347/14 |

* cited by examiner

PRINTING USING A SPECTROPHOTOMETER

BACKGROUND

Some signs or billboards are designed to be viewed both during the day and during the night. During the day, the illumination for the sign is generally daylight reflecting off the front surface of the sign. On the other hand, at night the signs are generally illuminated with a light source. Some signs may be illuminated with a light source that mimics daylight by directing light towards the front surface of the sign. Other signs may be backlit with a light source that is behind the sign that directs light through the sign.

BRIEF DESCRIPTION OF THE DRAWINGS

The drawings are provided to illustrate various examples of the subject matter described herein in this disclosure (hereinafter "herein" for short, unless explicitly stated otherwise) related to methods and apparatuses for printing using a spectrophotometer and are not intended to limit the scope of the subject matter. The drawings are not necessarily to scale.

DETAILED DESCRIPTION

Figure 1:
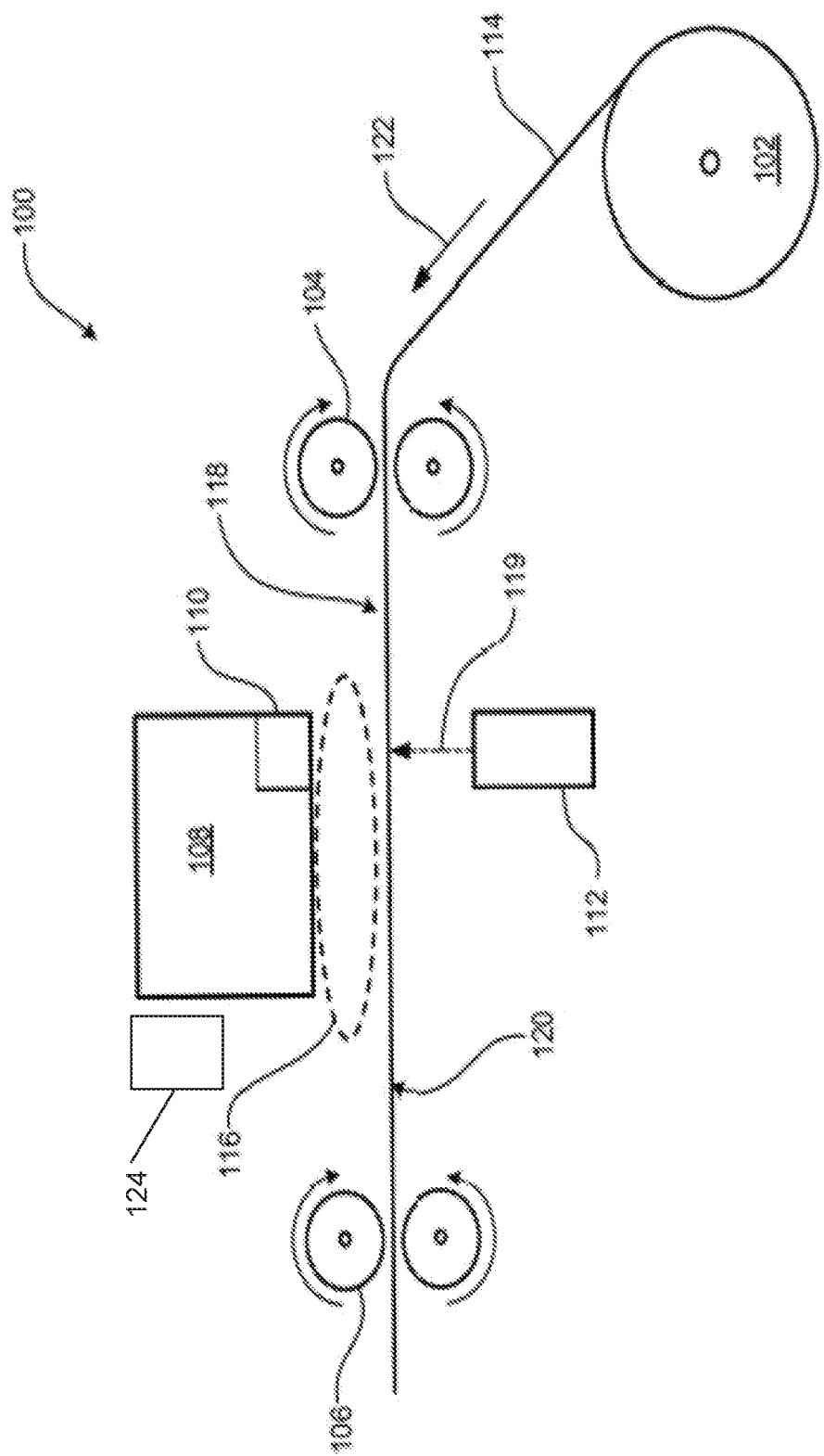
FIG. 1 is a schematic showing a side view of an example printer as described herein.

Signs or billboards that are used both during the day and night are known as "day and night" (or "D&N") signs. When printing on a print medium for a D&N sign, the same image is printed on the front side and the back side of the medium with the back image being a mirrored copy of the front side image. Back-lit signs may have an image printed on the front side of the sign and a mirrored copy of the image printed on the back side of the sign. When viewed during the day the front image is seen. When viewed at night the final image seen is a combination of the image printed on the back side of the sign and the image printed on the front side of the sign. When the image printed on the front side is not aligned (or not "registered") with the image printed on the back side, the combined image viewed at night may have quality issues—e.g., blurred edges or other visual defects.

For double-sided D&N printing, both front-lit printing and back-lit printing need to be maintained well color-managed. However, to the Inventors' knowledge there is no automatic color management method for day and night printing to date. Instead, currently a user employs some pre-processing color management (e.g., re-profiling the image in a software program such as Adobe Photoshop®) to change the color on the second side ("side B") printing to enable color accuracy and consistency. Such a trial and error method may be time consuming and only focused on a specific area of the image, rather than the image as a whole.

In view of the aforementioned challenges related to color accuracy and consistency, the inventors have recognized and appreciated the advantages of printing using a spectrophotometer. Following below are more detailed descriptions of various examples related to printing apparatuses and methods, particularly those involving a spectrophotometer. The various examples described herein may be implemented in any of numerous ways.

Provided in one aspect of the examples is a method, comprising: printing first color patches at a first location on a first side of a print medium; generating an international color consortium ("ICC") profile of the first side by characterizing the first color patches using a spectrophotometer; printing, using the ICC profile of the first side, second color patches at a second location on the first side of the print medium; printing third color patches on a second side of the print medium, the third patches being a registered mirrored copy of the second patches; and generating an ICC profile of the second side by characterizing the registered second and third patches using the spectrophotometer.

Provided in another aspect of the examples is a method, comprising: printing, using a raster image processor, first color patches without an ICC profile at a first location on a first side of a print medium; generating an ICC profile of the first side by characterizing the first color patches using a spectrophotometer in a reflection mode; printing, using the raster image processor and the ICC profile of the first side, second color patches at a second location on the first side of the print medium; printing third patches without an ICC profile on a second side of the print medium, the third patches being a registered mirrored copy of the second patches; and generating an ICC profile of the second side by characterizing the registered second and third patches using the spectrophotometer in a transmission mode.

Provided in another aspect of the examples is a non-transitory machine-readable medium stored thereon machine executable instructions, which when executed by a machine, performs a method comprising: printing first color patches at a first location on a first side of a print medium; generating an ICC profile of the first side by characterizing the first color patches using a spectrophotometer in a reflective mode; printing, using the ICC profile of the first side, second color patches at a second location on the first side of the print medium; printing third color patches on a second side of the print medium, the third patches being a registered mirrored copy of the second patches; and generating an ICC profile of the second side by characterizing the registered second and third patches using the spectrophotometer in a transmission mode.

To the extent applicable, the terms "first," "second," "third," etc. herein are merely employed to show the respective objects described by these terms as separate entities and are not meant to connote a sense of chronological order, unless stated explicitly otherwise herein.

Printing Apparatus

Double-sided D&N printing is a printing technique that allows a user to print an image on both sides of a printing substrate (or "print medium") with low m is-registration error. The term "registration" in the context of double-sided D&N printing as descried herein refers to the image on the first side ("side A") of the print medium aligned with the mirrored copy thereof on the second side ("side B"), so that the combined image looks the same under both the black-lit condition (i.e., at night) and the front-lit, normal ambient condition (i.e., during the day).

In one example, a printer prints an image of at least one fiducial mark on the first side of a print medium. The medium will be flipped over and a mirrored copy of the first image is printed on the second side of the medium. The mirrored copy of the image printed on the second side is aligned to the image on the first side using the fiducial mark(s) printed on the first side. The aligned images of the first and second sides are considered "registered."

In this example, the printer may locate the fiducial mark(s) using a sensor that looks through the medium to locate the fiducial mark(s) on the first side when the second side is being printed. The sensor may locate the fiducial mark(s) through the medium because a media path runs between the sensor and a light source. Because the print medium is between the light source and the sensor, the light source backlights the medium allowing the sensor to locate the fiducial mark(s). Once the second side has been printed, the fiducial mark(s) may be trimmed off, leaving only the images printed on both sides of the medium.

FIG. 1 is a schematic showing a side view of an example printer 100. Printer 100 comprises a media source 102, a pair of pinch rollers 104, a pair of take-up rollers 106, a print engine 108, a sensor 110, a light source 112 and print medium 114. A spectrophotometer 124 is also shown in the figure. A media path runs from the media source 102, between the pair of pinch rollers 104, underneath the print engine 108, and between the pair of take-up rollers 106. The print medium 114 is shown in the media path. During printing the print medium 114 travels along its length in a printing direction as shown by arrow 122. A print zone 116 is underneath the print engine 108. A "print zone" herein may refer to the location where printing fluid from the print engine is deposited onto the print medium 114. "Printing fluid" herein may refer to any liquid that is deposited by the print engine and may comprise black ink, colored inks, gloss, pre-treatment fluids, finishing fluids, and the like.

In this example, sensor 110 is located on the print engine 110. In other examples, the sensor may be located in a different position, for example adjacent to the print engine. Sensor 110 may be any suitable sensor that detects light intensity—e.g., a charged coupled device ("CCD"). Print medium 114 has a first side 118 (i.e., side A) and a second side 120 (i.e., side B). The first side 118 of the media is facing the print engine 108. Sensor is located above the first side 118 of the print medium 114.

Light source 112 is located below the sensor 110 facing the second side 120 of the print medium 114 such that the media path travels between the sensor 110 and the light source 112. Light 119 from the light source is directed towards the sensor. Light 119 from the light source 112 travels through the print medium 114 towards the sensor 110. Because the light travels through the print medium 114, the light 119 backlights the print medium such that the sensor may detect images and/or fiducial marks printed from the second side 120 of the media.

In this example, spectrophotometer 124 is located detached from the print engine 110. In other examples, the spectrophotometer may be located in a different position, for example, as a part of the print engine. Also, the spectrophotometer 124 may be a part of the printer (as shown), or it may be external to the printer, connecting to the printer using an electrical wire.

A spectrophotometer herein may refer to a photometer that measures a light beam's intensity as a function of its color (wavelength) in spectrophotometry. Spectrophotometry may refer to the quantitative measurement of the reflection or transmission properties of a material as a function of wavelength. Some notable features of a spectrophotometer are spectral bandwidth (the range of colors it may transmit through the test sample), the percentage of sample-transmission, the logarithmic range of sample-absorption, and sometimes a percentage of reflectance measurement. A spectrophotometer may be employed for the measurement of transmittance or reflectance of a material (in transmission and reflection modes, respectively). It may also be employed to measure the diffusivity on any of the light ranges that usually cover around 200 nm-2500 nm using different controls and calibrations.

The print medium 114 may be "day and night" medium. D&N media in some instances are known as banner media. A D&N print medium herein may be translucent. In one example, a D&N print medium is between 50% and 95% opaque, for example 90% opaque. Other values are also possible. D&N media may be in a roll or web containing 50 meters or more of material, but also may be as sheets of media. D&N media may comprise any suitable material. For example, the media may comprise a polymer. In one example, the print medium comprises polyvinyl chloride ("PVC"). In another example, the print medium comprises Polyethylene terephthalate ("PET") and/or polyproplyene ("PP"). In another example, the print medium comprises paper. In another example, the print medium comprises a banner comprising clothes. Other suitable materials may also be used. D&N media may have any suitable thickness. In one example, print medium has a thickness of between about 0.5 mm and about 2.0 mm, for example about 1.0 mm. Other vales are also possible.

Figure 2:
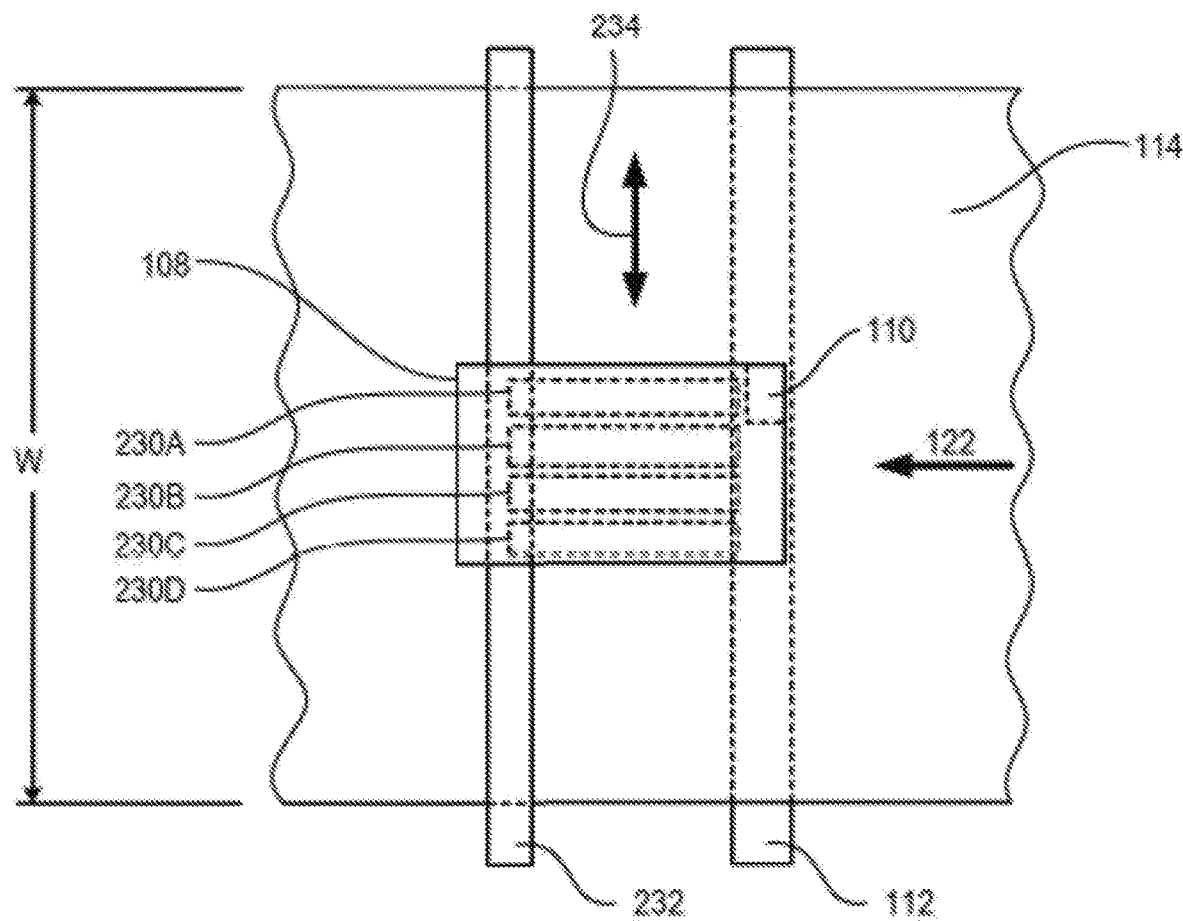
FIG. 2 is a schematic showing a sectional top view of the example printer as shown in FIG. 1.

FIG. 2 is a sectional top view of the example printer 100, showing some of the relevant components for illustration. In this example, print engine 108 is configured as a carriage mounted on guide rail 232. The carriage travels back and forth across the width W of the print medium 114 as shown by arrow 234. In some examples, the width of the print medium may be between about 60 and about 180 inches wide (i.e., about 1524 to about 4572 mm wide), for example about 130 inches (about 3,302 mm) wide. In other examples, the width of the media may be smaller or larger. The print engine 108 may also comprise motors, drive belts or gears, additional guide rails, linear position sensors, and the like, but these items are not shown for clarity.

Printheads (230A-230D) mounted in the carriage may deposit printing fluids onto the first side 118 (see FIG. 1) of print medium 114 as the carriage travels across the width of the print medium 114. In this example 4 printheads (230 A-D) are shown mounted in the carriage. Printheads (230A-230D) are removably mounted in the print engine and may be user loadable/replaceable. Each printhead may deposit a different printing fluid—e.g., the printheads (230A-230D) may deposit black ink, cyan ink, yellow ink and magenta ink, respectively. In other examples, there may be more or fewer printheads mounted in the carriage. When printing an image the print medium 114 is advanced in the printing direction 122 after each swath of the image is printed.

Sensor 110 is mounted in the carriage and sweeps back and forth across the print medium with the carriage. Light source 112 is positioned underneath the path the sensor makes as sensor travels back and forth across the medium. The print medium 114 travels between the sensor 110 and the light source 112, thereby allowing the light source to backlight the medium. In some examples, the sensor 110 may be used when the printheads are depositing printing fluids onto the print medium 114 and when the carriage is sweeping across the medium when the printheads are not depositing printing fluids onto the print medium 114. By sweeping the carriage across the full width of the print medium 114 and incrementally advancing the print medium 114 in the printing direction, the sensor may scan all areas of the print medium.

Figure 3:
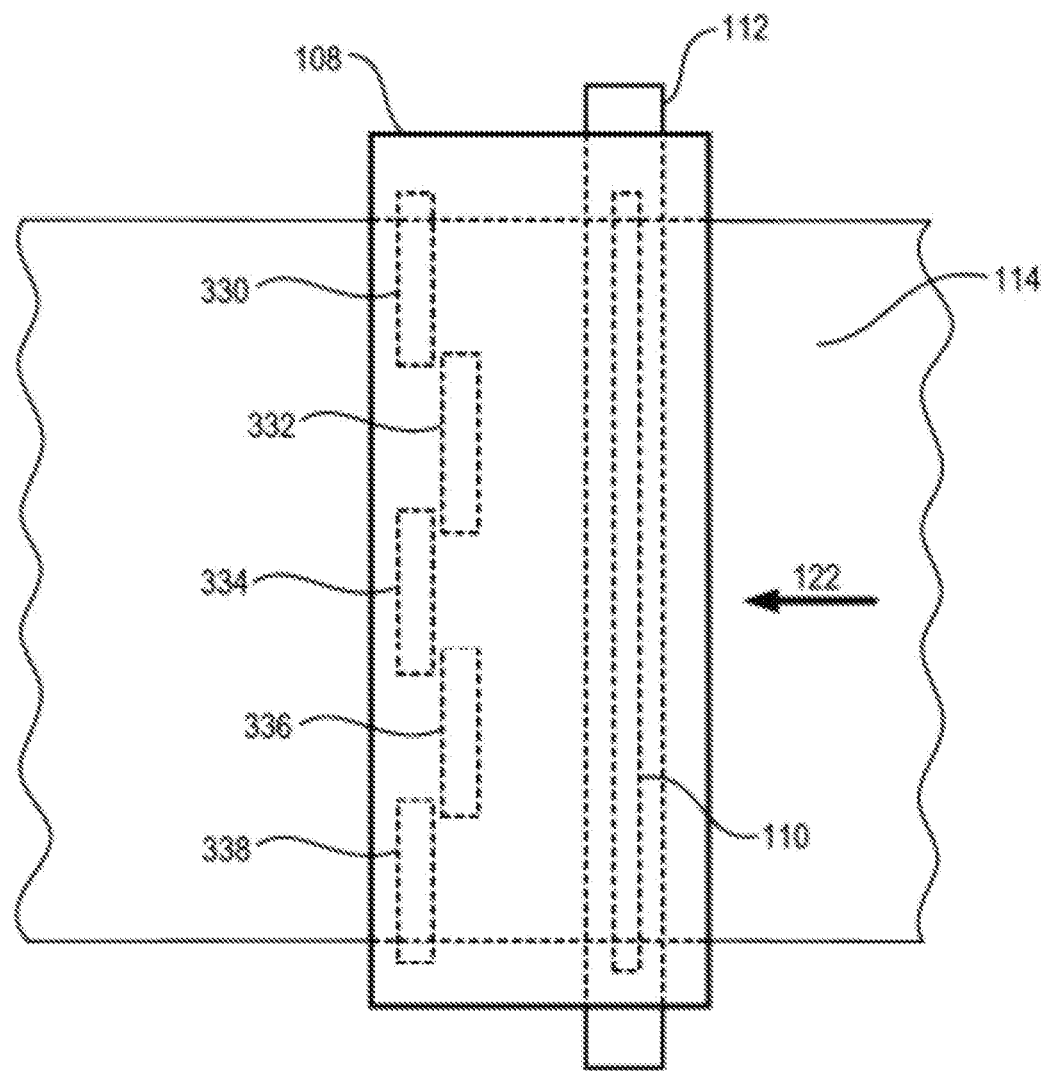
FIG. 3 is a schematic showing a sectional top view of another example printer described herein.

FIG. 3 is a sectional top view of another example printer. In this example print engine 108 is configured as a page wide array ("PWA") of printheads. The printheads (330-338) are arranged in a staggered line that stretches across the width of the print medium 114. In other examples, a single wide printhead may stretch across the full width of the print medium. During printing the print engine may remain stationary as the print medium moves underneath the print engine in the printing direction 122. In this example, there are 5 printheads that are mounted in the print engine and stretch across the width of the print medium. In other examples, there may be more or fewer printheads. Each printhead may deposit at least one type of printing fluid as the print medium moves underneath the print engine. For example, each printhead may deposit black ink, cyan ink, yellow ink, and magenta ink. In other examples, additional printing fluids may be deposited by each printhead.

In this example, sensor 110 is a line sensor, for example a line of CCDs that stretch across the width of the print medium 114. As the print medium moves in the printing direction 12, the sensor may scan the full width of the print medium 114. Light source 112 is positioned underneath sensor 110. The print medium 114 may travel between the sensor 110 and the light source 112, thereby allowing the light source to backlight the print medium 114.

During one example operation, printer 100 prints an image and at least one fiducial mark on one side of the medium, and then the printer prints a mirrored copy of the image on the other side of the medium after the medium is flipped over. The side of the print medium that gets printed on first is herein referred to as "side A." The side that gets printed on second, after the print medium is flipped over, is herein referred to as "side B." In some examples, the print medium is in a continuous roll. The roll of medium is flipped over after the image is printed on side A once or multiple times, such that the image may be printed on side B after the print job of all the image(s) to be printed on side A is completed. In other examples, the print medium may start as sheets of media, or may be cut into sheets after printing on side A. After printing on side A, the sheets of print medium may be flipped over such that the image may be printed onto side B.

A fiducial mark may be employed to facilitate registration of the images on side A and side B. In one example, printer 100 prints an image and at least one fiducial mark onto side A of the print medium. The print medium is flipped over such that side B of the print medium is now facing the print engine. As the flipped print medium is advanced into the print zone the printer turns on the light source 112 backlighting the print medium. The sensor is employed to scan and locate any fiducial mark(s) on side A through the medium. A mirrored copy of the image printed on side A of the print medium is printed onto side B of the print medium that is now facing the print engine. The mirrored copy of the image printed on side B is aligned to the image printed on the side A, such that the images on side A and side B are registered. The registration may involve using the relative positions of the images on side A and side B to the location of the fiducial mark(s) printed on side A of the media. In one example, only one of these relative positions is involved, and in another example both are involved.

Figure 4A:
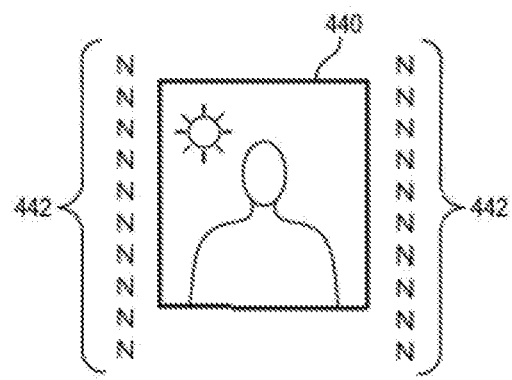
FIGS. 4A-4D are schematics showing an example of the printing on side A with fiducial marks: 4A shows an example of the print on side A; 4B-4D show different examples of a fiducial mark being scanned.
Figure 4:
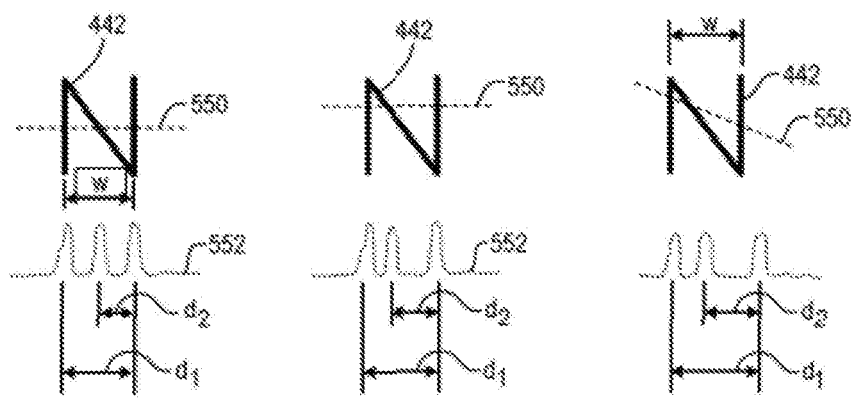

FIG. 4A is an example of the printing on side A. The printing on side A comprises an image 440 and fiducial marks 442 printed on both sides of the image 440. In this example the fiducial marks 442 are printed in a row down both sides of the image 440. In other examples, fewer fiducial marks may be used—e.g., only one fiducial mark 442 printed on one side of the image 440. In this example the fiducial marks are shaped like the letter 'N'. In other examples, other shapes may be used. The position of the fiducial marks relative to the position of the image is known. Therefore, when the location of a fiducial mark is determined, the location of the image is known.

Scanning the fiducial mark with a scan line creates peaks and valleys of light density. The peaks and valleys depend on where the scan line intersects the fiducial mark. FIG. 4B is an example fiducial mark being scanned. Fiducial mark 442 is shaped like the letter 'N'. Scan line 550 is shown passing through the middle of fiducial mark 442 without any skew. Line 552 is a plot of the optical intensity from scan line 550. The distance d1 is the distance between the two outer peaks. When the scan line passes through the fiducial mark with no skew distance d1 is equal to the actual width W of fiducial mark 442. Distance d2 is the distance between the middle peak and one of the outer peaks. In this example distance d2 is equal to ½ distance d1, indicating that scan line 550 is exactly between the top and bottom of fiducial mark 442.

FIG. 4C is an example fiducial mark being scanned. Scan line 550 is shown passing through the top of fiducial mark 442 without any skew. Line 552 is a plot of the optical intensity from scan line 550. The distance d1 is the distance between the two outer peaks. When the scan line passes through the fiducial mark with no skew distance d1 is equal to the actual width W of fiducial mark 442. Distance d2 is the distance between the middle peak and one of the outer peaks. In this example distance d2 is greater than ½ distance d1, indicating that scan line 550 is near the top of fiducial mark 442.

FIG. 4D is an example fiducial mark being scanned. Scan line 550 is shown passing through the top of fiducial mark 442 with some skew. Line 552 is a plot of the optical intensity from scan line 550. The distance d1 is the distance between the two outer peaks. When the scan line passes through the fiducial mark with skew, distance d1 is greater than the actual width W of fiducial mark 442. The difference between distance d1 and the actual width W may be used to determine the amount of skew.

In one example, the sensor scans with a resolution of 600 samples per inch. In other examples, the resolution may be higher or lower. When the print engine is configured as a carriage (as shown in FIG. 2), the sampling rate for the sensor may depend on the speed of the carriage. When the maximum carriage speed is 60 inches per second, the desired resolution of 600 samples per inch may result in a sampling rate for the sensor of 36 KHz. Other values are also possible. When the print engine is configured as a PWA, the line scanner may have a pixel spacing that matches the desired resolution.

Figure 5:
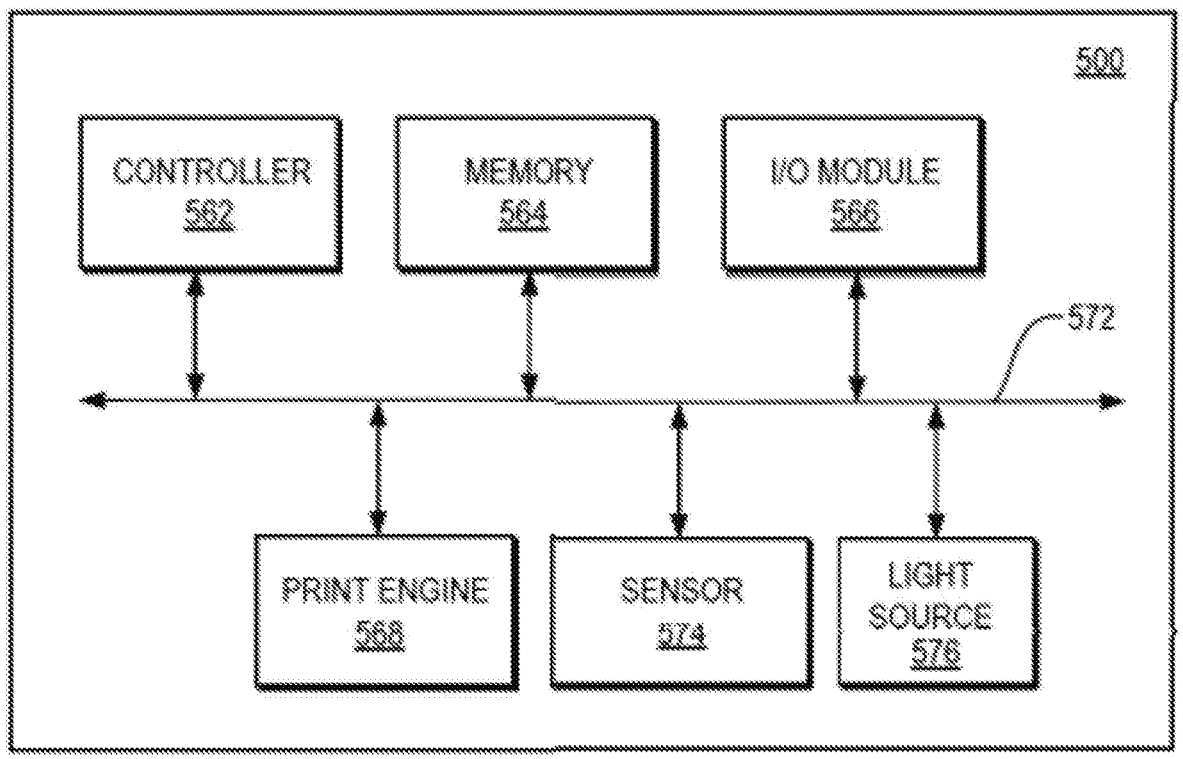
FIG. 5 is a schematic showing an electrical block diagram of an example printer 500 as described herein.

FIG. 5 is an electrical block diagram of an example printer 500. Printer comprises a controller 562, memory 564, input/output (I/O) module 566, print engine 568, sensor 574 and a light source 576 all coupled together on bus 572. As shown in FIG. 1, the printer may also comprise a spectrophotometer. In some examples printer may also have a user interface module, an input device, and the like, but these items are not shown for clarity.

Controller 562 may comprise at least one processor. The processor may comprise a central processing unit ("CPU"), a micro-processor, an application specific integrated circuit ("ASIC"), or a combination of these devices. Memory 564 may comprise volatile memory, non-volatile memory, and a storage device. Memory 564 may be a non-transitory computer readable medium. Examples of non-volatile memory include, but are not limited to, electrically erasable programmable read only memory ("EEPROM") and read only memory ("ROM"). Examples of volatile memory include, but are not limited to, static random access memory ("SRAM"), and dynamic random access memory ("DRAM"). Examples of storage devices include, but are not limited to, hard disk drives, compact disc drives, digital versatile disc drives, optical drives, and flash memory devices.

I/O module 566 may be employed to couple the printer to other devices, for example the Internet or a computer. Printer may have computer executable code (e.g., firmware) stored in the memory 564. The firmware is stored as machine readable instructions in the non-transitory computer readable medium (i.e. the memory 564). The term "machine" herein may refer to a processor, such as that of a computer. The processor may be any of those described herein. The processor may retrieve and execute the instructions stored in the non-transitory computer-readable medium to operate the printer and to execute functions. In one example, the processor executes code that registers and prints images onto a second side of medium. As described below, the process may also be used to establish baseline ICC profiles of the first and second sides of the print medium for future printing reference.

The term "machine-readable instruction" are employed herein in a generic sense to refer to any type of machine code or set of machine-executable instructions that may be employed to cause a machine (e.g., a computer or another type of processor) to implement the various examples described herein. The machine-readable instructions may include, but not limited to, a software or a program. The machine may refer to a computer or another type of processor. Additionally, when executed to perform the methods described herein, the machine-readable instructions need not reside on a single machine, but may be distributed in a modular fashion amongst a number of different machines to implement the various examples described herein.

Machine-executable instructions may be in many forms, such as program modules, executed by at least one machine (e.g., a computer or another type of processor). Generally, program modules include routines, programs, objects, components, data structures, etc. that perform particular tasks or implement particular abstract data types. Typically, the functionality of the program modules may be combined or distributed as desired in various examples.

Figure 6:
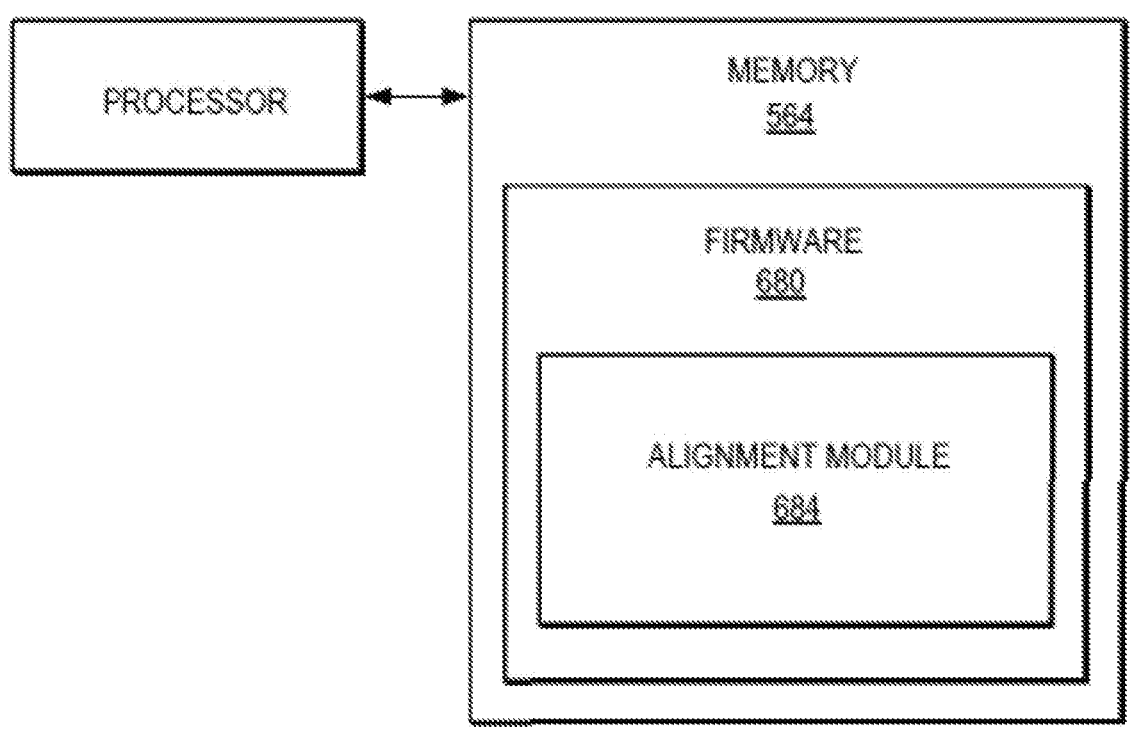
FIG. 6 is a schematic showing an example block diagram of the processor coupled to memory 564 as described herein.

FIG. 6 is an example block diagram of the processor coupled to memory 564. Memory 564 contains firmware 680. Firmware 680 contains an alignment module 684. The processor executes the code in the alignment module 684 to print an image on the second side of D&N media.
Color Management As discussed above, the color management of double-sided D&N printing may be important to ensure quality of the final print out. Provided herein are methods that may be employed for color management, particularly those involving spectrophotometer.

Figure 7:
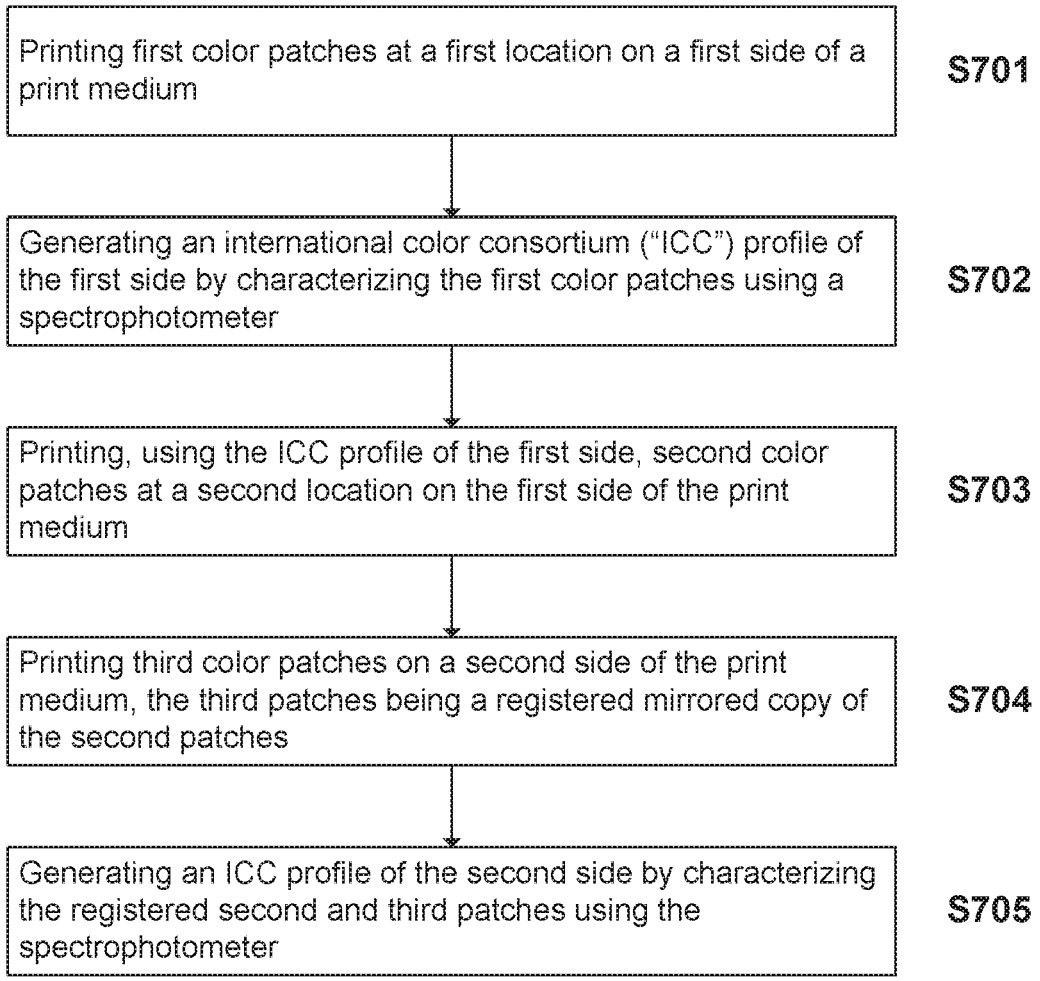
FIG. 7 is a flowchart illustrating, in one example, the processes involved in establishing the respective ICC profiles of side A and side B of a particular print medium under a specific printing condition.

FIG. 7 shows the flowchart of the processes involved in an example method to establish the color profile baseline with respect to a specific print medium (material) and the printing mode. The method comprises printing first color patches at a first location on a first side of a print medium (S701). In one example, the first color patches are printed without an international color consortium ("ICC") profile. The print medium may be any of those described herein.

The method may also comprise generating an ICC profile of the first side by characterizing the first color patches using a spectrophotometer (S702). In the context of color management, an ICC profile is a set of data that characterize a color input or output device, or a color space, according to standards promulgated by the International Color Consortium ('ICC"). In one example, an ICC profile describes the color attributes of a particular device or viewing requirement by defining a mapping between the device source or target color space and a profile connection space ("PCS"). This PCS is either CIELAB (L*a*b*) or CIEXYZ. Mappings may be specified using tables, to which interpolation is applied, or through a series of parameters for transformations. The profile may be generated by, for example, a spectrophotometer.

An ICC profile may be considered a mapping from a color space to the PCS, and from the PCS to the color space. The profile may do this using tables of color values to be interpolated (separate tables will be needed for the conversion in each direction), or using a series of mathematical formulae. In one example, an ICC profile may define several mappings, according to rendering intent. These mappings allow a choice between closest possible color matching, and remapping the entire color range to allow for different gamuts.

As described herein, an ICC profile may be generated using a spectrophotometer. For example, the generation of the ICC profile of the first side may comprise characterizing the first color patches using the spectrophotometer in a reflection mode. A spectrophotometer in a reflection mode may be configured to measure the reflective property of a material.

As shown in FIG. 7, the method may also comprise printing, using the ICC profile of the first side, second color patches at a second location on the first side of the print medium (S703). The second location may refer to a different location from the first location on the print medium (in the case of a continuous roll), or it may refer to on the relative location (e.g., to a fiducial mark) on a different sheet of the (same type of) print medium. The method may also comprise printing third color patches on a second side of the print medium, the third patches being a registered mirrored copy of the second patches (S704). In one example, the third color patches are printed without an ICC profile.

The method may additionally comprise generating an ICC profile of the second side by characterizing the registered second and third patches using the spectrophotometer (S705). As described herein, an ICC profile may be generated using a spectrophotometer. For example, the generation of the ICC profile of the second side may comprise characterizing the (combined) registered first and third color patches using the spectrophotometer in a transmission mode. A spectrophotometer in a transmission mode may be configured to measure the transmissive property of a material.

It is noted that while in this example the third color patches are registered mirrored copy of the second color patches, it is possible to have the third color patches being the registered mirrored copy of the first color patches. As a result of this configuration, a different ICC profile of side B may be generated.

Any of the printing processes described herein may be accomplished by any suitable printer, such as one suitable for D&S printing, including those described herein (e.g., those as shown in FIGS. 1 and 5). An example of such a printer may be an HP Latex printer commercially available from HP Inc., USA. In one example, the printing process may involve a raster image processor ("RIP"). In one example, at least one of the (i) printing first color patches, (ii) printing second color patches, and (iii) printing third color patches involves a raster image processor.

The RIP may be a part of the print engine as described herein. The RIP may also locate elsewhere in the printer. In one example, an RIP is a component used in a printing system which produces a raster image also known as a bitmap. Such a bitmap is used by a later stage of the printing system to produce the printed output. The input may be a page description in a high-level page description language such as PostScript, Portable Document Format, XPS, or another bitmap of higher or lower resolution than the output device. In the latter case, the RIP applies either smoothing or interpolation algorithms to the input bitmap to generate the output bitmap. An RIP may be implemented either as a software component of an operating system or as a firmware program executed on a microprocessor inside a printer, though for high-end typesetting, standalone hardware RIPs are sometimes used. Ghostscript and GhostPCL are examples of software RIPs. A PostScript printer may contain an RIP in its firmware.

As a result of the method as described in FIG. 7, an ICC profile of the first side (or side A) and an ICC profile of the second side (or side B) may be generated specifically related to the printing condition and material of the print medium as characterized. These profiles may then be employed as a baseline for double-sided D&N printing using the same printing condition and print medium material. The profiles may be stored in storage medium, such as any of those described here for future reference.

The method as shown in FIG. 7 may comprise addition processes. For example, the generated ICC profiles of side A and side B may be employed to print an image using double-sided D&N printing. In one example, the method further comprises printing an image on a third location on the first side of print medium using the ICC profile of the first side; and printing a registered mirrored copy of the image on the second side of the print medium using the ICC profile of the second side.

Also, as described herein, double-sided D&N printing may involve printing and using fiducial mark(s) to register the images printed on side A and side B. The use of fiducial marks are described above. In one example, the method further comprises printing at least one fiducial mark on the first side of the print medium so that the third color patches are registered with the first color patches using the respective relative positions of the third and first patches to a location of the at least one fiducial mark.

Figure 8:
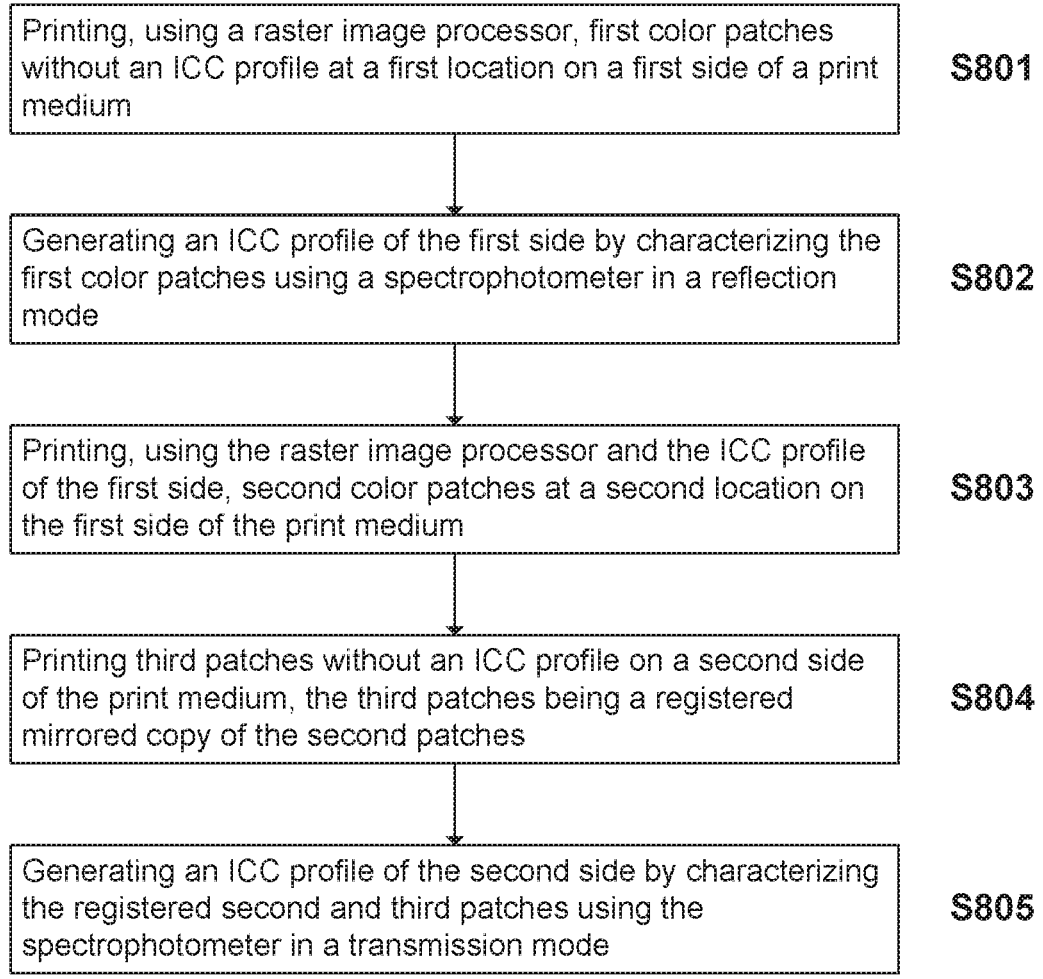
FIG. 8 is a flowchart illustrating, in another example, the processes involved in establishing the respective ICC profiles of side A and side B of a particular print medium under a specific printing condition.

FIG. 8 shows the flowchart of the processes involved in another example method to established the color profile baseline with respect to a specific print medium (material) and the printing mode. The method may comprise printing, using a raster image processor, first color patches without an ICC profile at a first location on a first side of a print medium (S801). The method comprise generating an ICC profile of the first side by characterizing the first color patches using a spectrophotometer in a reflection mode (S802). The method may also comprise printing, using the raster image processor and the ICC profile of the first side, second color patches at a second location on the first side of the print medium (S803). The method may also comprise printing third patches without an ICC profile on a second side of the print medium, the third patches being a registered mirrored copy of the second patches (S804). The method may also comprise generating an ICC profile of the second side by characterizing the registered second and third patches using the spectrophotometer in a transmission mode (S805).

The method may additionally comprise carrying out a double-sided D&N print job using the ICC profiles as generated from the method of FIG. 8. In one example, the method further comprises printing an image on a third location on the first side of the print medium using the ICC profile of the first side; and printing a registered mirrored copy of the image on the second side of the print medium using the ICC profile of the second side.

As described herein, at least one fiducial mark may be employed to facilitate registration. For example, the method of FIG. 8 may further comprise printing an image and at least one fiducial mark on the first side of the print medium using the ICC profile of the first side; and printing a registered mirrored copy of the image on the second side of the print medium using the ICC profile of the second side. The mirrored copy is registered using the respective relative positions of the image and the mirrored copy to a location of the at least one fiducial mark.

Various examples described herein may be embodied at least in part as a non-transitory machine-readable storage medium (or multiple machine-readable storage media)— e.g., a computer memory, a floppy disc, compact disc, optical disc, magnetic tape, flash memory, circuit configuration in Field Programmable Gate Arrays or another semiconductor device, or another tangible computer storage medium or non-transitory medium) encoded with at least one machine-readable instructions that, when executed on at least one machine (e.g., a computer or another type of processor), cause at least one machine to perform methods that implement the various examples of the technology discussed herein. The computer readable medium or media may be transportable, such that the program or programs stored thereon may be loaded onto at least one computer or other processor to implement the various examples described herein.

For example, provided herein is a non-transitory machine-readable medium stored thereon instructions, which when executed, cause at least one machine to perform any of the processes described herein. In one example, the method comprise printing first color patches at a first location on a first side of a print medium. The method may also comprise generating an ICC profile of the first side by characterizing the first color patches using a spectrophotometer in a reflective mode. The method may also comprise printing, using the ICC profile of the first side, second color patches at a second location on the first side of the print medium. The method may also comprise printing third color patches on a second side of the print medium, the third patches being a registered mirrored copy of the second patches. The method may also comprise generating an ICC profile of the second side by characterizing the registered second and third patches using the spectrophotometer in a transmission mode.

One example herein also provides a printer, such as any of those described herein, that contains a non-transitory machine-readable medium stored thereon machine-readable instructions to carry out the methods as described herein.

The printer may further comprise a spectrophotometer. In another example, the spectrophotometer is not internal to the printer, but rather external and connected (e.g., electrically) to the printer.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The indefinite articles "a" and "an," as used herein in this disclosure, including the claims, unless clearly indicated to the contrary, should be understood to mean "at least one." Any ranges cited herein are inclusive.

The terms "substantially" and "about" used throughout this disclosure, including the claims, are used to describe and account for small fluctuations, such as due to variations in processing. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

What is claimed:

1. A method, comprising:
   printing first color patches at a first location on a first side of a print medium;
   generating an international color consortium ("ICC") profile of the first side by characterizing the first color patches using a spectrophotometer;
   printing, using the ICC profile of the first side, second color patches at a second location on the first side of the print medium;
   printing third color patches on a second side of the print medium, the third patches being a registered mirrored copy of the second patches; and
   generating an ICC profile of the second side by characterizing the registered second and third patches using the spectrophotometer.

2. The method of claim 1, further comprising:
   printing an image on a third location on the first side of print medium using the ICC profile of the first side; and
   printing a registered mirrored copy of the image on the second side of the print medium using the ICC profile of the second side.

3. The method of claim 1, further comprising printing at least one fiducial mark on the first side of the print medium so that the third color patches are registered with the first color patches using respective relative positions of the third and first patches to a location of the at least one fiducial mark.

4. The method of claim 1, wherein generating the ICC profile of the first side comprises characterizing the first color patches using the spectrophotometer in a reflection mode.

5. The method of claim 1, wherein generating the ICC profile of the second side comprises characterizing the registered first and third color patches using the spectrophotometer in a transmission mode.

6. The method of claim 1, wherein the first color patches are printed without an ICC profile.

7. The method of claim 1, wherein the third color patches are printed without an ICC profile.

8. The method of claim 1, wherein at least one of the (i) printing first color patches, (ii) printing second color patches, and (iii) printing third color patches involves a raster image processor.

9. The method of claim 1, wherein the print medium is between 50% and 95% opaque.

10. The method of claim 1, wherein the print medium comprises polyvinyl chloride.

11. A method, comprising:
    printing, using a raster image processor, first color patches without an ICC profile at a first location on a first side of a print medium;
    generating an ICC profile of the first side by characterizing the first color patches using a spectrophotometer in a reflection mode;
    printing, using the raster image processor and the ICC profile of the first side, second color patches at a second location on the first side of the print medium;
    printing third patches without an ICC profile on a second side of the print medium, the third patches being a registered mirrored copy of the second patches; and
    generating an ICC profile of the second side by characterizing the registered second and third patches using the spectrophotometer in a transmission mode.

12. The method of claim 11, further comprising:
    printing an image on a third location on the first side of the print medium using the ICC profile of the first side; and
    printing a registered mirrored copy of the image on the second side of the print medium using the ICC profile of the second side.

13. The method of claim 11, further comprising:
    printing an image and at least one fiducial mark on the first side of the print medium using the ICC profile of the first side; and
    printing a registered mirrored copy of the image on the second side of the print medium using the ICC profile of the second side, the mirrored copy being registered using respective relative positions of the image and the mirrored copy to a location of the at least one fiducial mark.

14. A non-transitory machine-readable medium stored thereon machine executable instructions, which when executed by a machine, performs a method comprising:
    printing first color patches at a first location on a first side of a print medium;
    generating an ICC profile of the first side by characterizing the first color patches using a spectrophotometer in a reflective mode;
    printing, using the ICC profile of the first side, second color patches at a second location on the first side of the print medium;
    printing third color patches on a second side of the print medium, the third patches being a registered mirrored copy of the first patches; and
    generating an ICC profile of the second side by characterizing the registered first and third patches using the spectrophotometer in a transmission mode.

15. A printer comprising the non-transitory machine-readable medium of claim 14 and the spectrophotometer.

* * * * *